(No Model.)

G. W. BLAIR.
MANUFACTURE OF GLASSWARE.

No. 604,959. Patented May 31, 1898.

WITNESSES

Geo. W. Blair INVENTOR

UNITED STATES PATENT OFFICE.

GEORGE W. BLAIR, OF PITTSBURG, PENNSYLVANIA.

MANUFACTURE OF GLASSWARE.

SPECIFICATION forming part of Letters Patent No. 604,959, dated May 31, 1898.

Application filed March 27, 1897. Serial No. 629,505. (No model.)

*To all whom it may concern:*

Be it known that I, GEORGE W. BLAIR, of Pittsburg, in the county of Allegheny and State of Pennsylvania, have invented a new and useful Improvement in the Manufacture of Glassware, of which the following is a full, clear, and exact description, reference being had to the accompanying drawings, forming part of this specification, in which—

Figure 1:
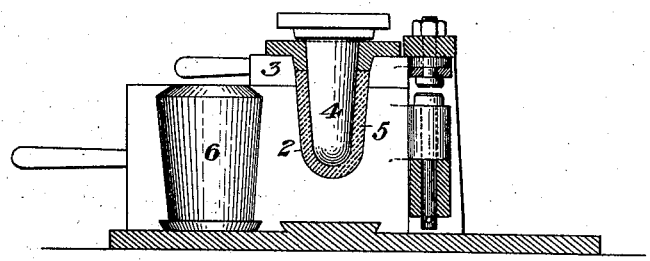
Figure 2:
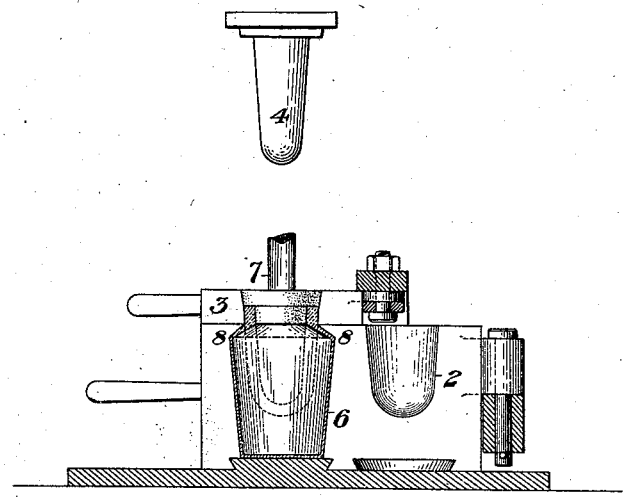

Figure 1 is a longitudinal sectional view of my apparatus, showing the pressing-mold cavity in use. Fig. 2 is a like view showing the glass while being expanded by blowing.

It has been the practice heretofore in the manufacture of bottles and similar articles to employ a combined method of pressing and blowing by which a blank has first been pressed and the upper end thereof simultaneously pressed into finished shape and the article then finished by expanding and blowing in a mold. Such method, however, has not heretofore been possible to apply to the manufacture of tumblers and like articles, for the upper ends of blown tumblers should be no thicker than the body of the tumbler and should be more shapely and regular than it is possible to obtain by pressing.

My invention affords means whereby the method above mentioned, with all its attendant advantages and economies, can be applied to the manufacture of tumblers and such articles; and it consists in a mold wherein a previously-pressed small blank is expanded, said mold having a body part, a portion of which is of the shape of the finished article, and a supplementary neck portion wherein the blank is held during the blowing operation. The article formed in this mold is finally finished by cracking off the supplemental neck portion and an adjacent portion of the blown body, the remainder of the body portion then being fitted for use.

In the drawings, 2 is the matrix-cavity in which the blank is molded. It has a ring 3 and a plunger 4, and, if desired, the mold may be made in two parts in the usual manner. After the blank 5 has been molded it is expanded in a blow-mold cavity 6, the upper end or neck of the blank being then held by the ring 3 and by a blowpipe 7, having a mouth, which is fitted within the neck of the blank. The body of the mold up to the level of the dotted line 8 8 is of the contour of the tumbler or finished article. The blank 5 is placed within the matrix of the mold and is expanded therein by blowing, the result being an article of the shape such as shown in Fig. 2. This article is then moved from the mold. Its upper part is cracked off on the line 8 8, thus removing the neck or pressed portion of the blank and an adjacent part of the blown body portion. The article then, after having its upper edge fire-finished, is fitted for use.

The advantage of this mode of manufacture is that it enables the article to be made with very little cost and very rapidly, with its upper portion as thin and shapely as is made by the ordinary process of blowing. The advantages of the invention in this regard will be appreciated by those skilled in the art.

My invention may be applied to the manufacture of many glass articles and is susceptible of modification in the form of construction and apparatus used.

I claim—

The method of making glass articles, which consists in forming a blank with a neck portion and a body portion by pressing, expanding the body portion by blowing, and then cutting off the said neck portion and an adjacent part of the blown body portion, and from the remainder of the body portion constituting the finished article, substantially as described.

In testimony whereof I have hereunto set my hand.

GEORGE W. BLAIR

Witnesses:
G. I. HOLDSHIP